CROSS REFERENCE   EXAMINER

United States Patent Office 3,072,579
Patented Jan. 8, 1963

3,072,579
METHOD OF REMOVING EPOXY, SILICONE AND MELAMINE COATINGS
Kenneth W. Newman, Van Nuys, Calif.
(4628 Arriba Drive, Tarzana, Calif.)
No Drawing. Filed Oct. 28, 1959, Ser. No. 849,142
4 Claims. (Cl. 252—143)

This invention relates to compositions useful in the removal or stripping of paints or coatings and is more specifically directed to a composition particularly effective in the removal of epoxy, silicone, and melamine coatings.

During recent years, very adherent, durable paints and like compositions based upon epoxy, silicone and melamine resins have been developed by a number of paint manufacturers. Because of the superior properties of these paints or coating compositions over the conventional lacquers and paints used at the present time, a large number of manufacturers have attempted to adapt their production facilities and processes to these specific new types of coating compositions. Such efforts have not been completely satisfactory, not because of any fault of the new coating compositions, but because it has been substantially impossible to strip these compositions from defectively coated parts on a commercial production-line basis.

It is an object of the present invention to provide new solvent-type paint stripping compositions which are distinguished from prior paint stripping compositions by virtue of their superior effectiveness with the new types of coating compositions based upon epoxy, silicone, or melamine resins. It is not to be considered that the present invention is limited to compositions useful in removal of coatings of these three varieties, as the compositions herein specified may be applied with substantially equal facility and effectiveness to various conventionally known paints and lacquers. Further objects as well as advantages of this invention will be apparent from the remainder of this specification including the appended claims.

The present invention may be briefly described as a coating remover composition which is substantially free from alcohol and which includes as its basic constituents trichloroacetic acid, orthocresol, and a chlorinated organic solvent which is relatively chemically unreactive with the first two constituents. It is believed that the trichloroacetic acid acts in the nature of a bond-releasing agent to break the bond holding a paint film to a supporting surface, while the orthocresol functions as a penetrating agent to assist the acid in penetrating a coating film. The chlorinated organic solvent acts somewhat as a swelling agent which causes the coating to swell or expand and thus move away from the surface to which it has been attached. Limited quantities of water, in the range of 0.1% to 2%, are also considered essential to incorporation in my composition. It is believed that water, in amounts as low as 0.1%, must be present in solution in the non-aqueous phase in order to activate the trichloroacetic acid to an ionic state and thus render hydrogen ions available.

Corrosion inhibitors and wetting or rinsing agents are generally added to most conventional paint stripping compositions in order to prevent attack of the metal and to contribute their surface active characteristics to the composition. Such conventional constituents may be used in the present composition to advantage. Notwithstanding the effectiveness of my composition without their incorporation, a commercial formulation of the composition of this invention would contain such conventional inhibitors and wetting agents.

The present invention is to a substantial extend predicated upon the discovery that trichloroacetic acid in combination with orthocresol quite unexpectedly exercises a very material effect in causing a coating, particularly one selected from the classes indicated, to be released from a supporting surface. The effectiveness of trichloroacetic acid for this purpose and in this combination is very unexpectedly and materially greater than the effectiveness of such related compounds as di- or monochloroacetic acid for the same purpose. In general, from about 5 to about 25% of trichloroacetic acid is utilized with the invention. If less than about 5% of this acid is employed, the stripping action of the compositions of the invention is too slow to be effectual for most commercial purposes. The maximum amount of trichloroacetic acid employed in compositions of the invention is determined by the solubility or miscibility of the trichloroacetic acid with the other constituents employed. If too much trichloroacetic acid is employed, it tends to separate out as a separate phase.

It has thus far been found that orthocresol is the only material, performing what may be referred to as a coating penetrating function, which can be effectively used in conjunction with trichloroacetic acid. Conventional compositions, exemplified by cresylic acid, which is a wide-boiling mixture of the three cresols, occasionally including phenol itself, do not function in combination with trichloroacetic acid as effective coating stripper compositions because of their comparatively high reactivity with trichloroacetic acid. Conventional penetrating agents such as cresylic acid and the aliphatic alcohols cannot be employed because they form compounds with trichloroacetic acid such as esters which are ineffectual in paint stripping. Indeed, it is important that the composition of my invention be free from alcohols because their presence results in esterification reactions which reduce the effective concentration of trichloroacetic acid.

Orthocresol is the only material which I have discovered to retain its own individual effectiveness without diminishing the basic effectiveness of the indicated acid. With this compound, the hydroxyl group is positioned ortho to a methyl group with the result that the methyl group tends to "block" esterification with the trichloroacetic acid employed. Although it may be assumed that an exceedingly small amount of esterification of the orthocresol may occur, the extent of reaction is insufficient to interfere with the function of the composition.

Othocresol as presently obtainable commercially does contain various minor proportions of phenols and meta and para cresols, as well as other compounds. The presence of small proportions of such other ingredients in a composition which is predominantly orthocresol in content is not considered objectionable from a commercial standpoint, even though the trichloroacetic acid used as a bond-releasing agent reacts with such other compounds. The important factor is that such impurities are not present in commercial orthocresol in sufficient quantities to react with and inhibit the activity of trichloroacetic acid to any significant extent.

The amount of orthocresol employed is usually within the percentage range by weight of from 10 to 25% when coating stripping compositions of the invention are to be used with particularly difficult materials to strip, such as, for example, compositions based upon any of the three resins indicated in the preceding discussion. If more than about 25% by weight of orthocresol is employed, no commercially significant added benefit is obtained with respect to the effectiveness of the compositions of the invention. It is possible to form coating or paint strippers in accordance with this disclosure in which less than 10% of orthocresol is used, but such stripper compositions are not effective with coatings which are very difficult to strip, although they may be used commercially with other comparatively easily stripped coatings.

Although, as already indicated, it is necessary to incorporate small amounts of water in the composition, it is normally preferred to employ up to about 20% by weight of water. The excess, over and above the small amount which is dissolved or dispersed in the stripping composition and which serves to activate it, rises to the surface of the composition and acts as a sealant, preventing loss of volatile ingredients from it through evaporation. Such an aqueous layer normally contains small proportions of the various ingredients in the lower, substantially nonaqueous layer, but the presence of such minor proportions of these ingredients is not detrimental, and is in general unobjectionable.

Because of the extreme corrosive nature of trichloroacetic acid, it is usually preferred to incorporate various small amounts of any conventional corrosion inhibitors, such as, for example, diethylthiourea, mercapto benzo thiazole, or such proprietary compositions as Antaron R-275 which contains about 80% sodium alkyl naphthalene sulfonate and about 20% sodium sulfate. In general, three different classes of inhibitors will normally be found particularly suitable for use with the invention. These inhibitors either contain reactive nitrogen or sulfur groups, or both, or the chromate ion. The first two classes of inhibitors mentioned are exemplified by the above-noted compounds and compositions. Suitable examples of the third class of inhibitors are chromic acid, sodium or potassium chromate, or either sodium or potassium dichromate. In addition, the corresponding ammonium derivatives of chromic acid may be employed in a single stripping composition. The amount of inhibitor necessary with the invention is in general exceedingly small. By judicious use of inhibitors, such as those noted above, or combinations thereof, it is possible to inhibit the attack of the paint stripping compositions of the invention upon such conventional metals as iron, aluminum, and brass. Usually between 0.1 and 0.5% of the inhibitor or combination of inhibitors is required. The specific type of corrosion inhibitor used in commercial formulations of my composition does not form a part of my invention, and any suitable conventional type can be used.

Various conventional surface active wetting or rinsing agents which are substantially unreactive with trichloroacetic acid are also desirably employed in compositions of the invention. One particularly suitable wetting agent is sodium alkyl naphthalene sulfonate. Other anionic, cationic, or nonionic wetting agents can also be employed with the invention. In general, less than about 1% by weight of such agents is employed. It is not considered necessary to provide any detailed description of suitable combined wetting and rinsing agents in this specification inasmuch as such compositions are well known to the art at the present time.

The chlorinated organic solvent used in my composition is exemplified by trichloroethylene, methylene chloride, ethylene dichloride, chloroform, propylene dichloride, carbon tetrachloride, perchloroethylene, dichloroethylene, 1,2,4 trichlorobenzene and orthodichlorobenzene. All of these chlorinated materials are liquid throughout the entire range of operating temperatures normally employed with the compositions of the invention. The particular chlorinated organic solvent used is best chosen with reference to the operating temperature for which a particular coating stripping composition is formulated. Thus, the chlorinated aliphatic hydrocarbons indicated in the preceding discussion are preferably employed with compositions which are designed to be used at room temperatures; while chlorinated benzene derivatives, such as orthodichlorobenzene, are primarily suitable for use with compositions which are designed to be used at temperatures up to about 160° F. If higher temperatures are employed with the stripping compositions herein specified, there is apt to be a considerable loss of the ingredients of such compositions by volatilization. In many cases, particularly when a comparatively limited amount of water is used as a sealant, or when no sealant is employed, a problem due to toxicity of the vapors given off may arise.

In general, the quantity of the chlorinated organic solvent is varied so that it acts as an "adjusting" ingredient to bring the total composition up to 100% by weight, although this constituent will normally be present in amounts not less than about 20% by weight of the total composition.

The following examples are illustrative formulations of my coating stripper. These compositions were prepared by blending or mixing the ingredients listed together with conventional stirring apparatus at room temperature.

EXAMPLE I

| | | |
|---|---|---|
| Crude trichloroacetic acid | gm | 10 |
| Methylene chloride | cc | 24 |
| Crude orthocresol (95% pure on a water-free basis) | cc | 12 |
| Water | cc | 8 |

EXAMPLE II

| | | |
|---|---|---|
| Crude trichloroacetic acid | gm | 10 |
| Orthodichlorobenzene | cc | 24 |
| Crude orthocresol (95% pure on a water-free basis) | cc | 12 |
| Water | cc | 8 |

EXAMPLE III

| | | |
|---|---|---|
| Crude orthocresol (95% pure on a water-free basis) | gm | 14 |
| Trichloroacetic acid | gm | 5 |
| Diethylthiourea | gm | 0.2 |
| Potassium chromate | gm | 0.05 |
| Water | gm | 2 |
| Sodium alkyl naphthalene sulfonate (anionic wetting-rinsing agent) | percent | 0.1 |
| Methylene chloride | gm | 78.65 |

EXAMPLE IV

| | Gm. |
|---|---|
| Crude orthocresol (95% pure on a water-free basis) | 34 |
| Trichloroacetic acid | 25 |
| Water | 20 |
| Sodium chromate | 0.05 |
| Sodium alkyl naphthalene sulfonate | 0.1 |
| Tricholoroethylene | 20.65 |

EXAMPLE V

| | Gm. |
|---|---|
| Crude orthocresol (95% pure on a water-free basis) | 20 |
| Water | 15 |
| Mercapto benzo thiazole | 0.2 |
| Chromic acid | 0.5 |
| Trichloroacetic acid | 15 |
| Sodium alkyl, napthalene sulfonate | 0.1 |
| Carbon tetrachloride | 49.65 |

EXAMPLE VI

A composition as specified in Example III with the same weight of 1,2,4 trichlorobenzene substituted for methylene chloride.

EXAMPLE VII

A composition as specified in Example IV with an equal weight of orthodichlorobenzene substituted for trichloroethylene.

EXAMPLE VIII

A composition as specified in Example V with an equal weight of orthodichlorobenzene substituted for carbon tetrachloride.

Each of the foregoing compositions is effective in the removal of epoxy, silicone or melamine resin based coatings within five minutes of immersion of a 20 mill thick coating on a metal specimen.

The following additional examples will substantiate the surprising effectiveness of trichloroacetic acid in combination with orthocresol and a chlorinated organic solvent in substantially alcohol-free compositions, as contrasted with compositions containing various alcohols and those in which orthocresol is either omitted or replaced by meta cresol, para cresol or phenol.

EXAMPLES IX–XIII

Tests were run on 1" by 3" sections of shell cases which had been treated to have a high-bake epoxy resin coating. Sets of ten specimens, each set having epoxy coatings varying from 5 mills to 50 mills in thickness, were treated with the compositions indicated below by immersing the sets of samples therein at room temperature for the indicated periods. The compositions were prepared by adding the indicated constituents to containers and allowing the resulting compositions to sit for 24 hours at room temperature to permit achievement of substantially equilibrium conditions before testing proceeded.

|  | Examples | | | | |
|---|---|---|---|---|---|
|  | IX, Parts | X, Parts | XI, Parts | XII, Parts | XIII, Parts |
| Methylene chloride | 18 | 18 | 18 | 18 | 18 |
| Trichloroacetic acid | 10 | 10 | 10 | 10 | 10 |
| Water | 8 | 8 | 8 | 8 | 8 |
| Orthocresol |  | 10 |  |  |  |
| Methyl alcohol |  |  | 10 |  |  |
| Ethyl alcohol |  |  |  | 10 |  |
| Isopropyl alcohol |  |  |  |  | 10 |

(All parts are parts by weight of the total composition.) (No other constituents were used.)

The results were observed visually as follows:

Results

IX—Stripped resin in 15 minutes.
X—Stripped resin in 30 seconds.
XI—Did not strip resin in 60 minutes.
XII—Did not strip resin in 60 minutes.
XIII—Did not strip resin in 60 minutes.

The coatings which were stripped off did so by wrinkling and slipping off leaving the bare metal surface. The removed coatings were soft and pliable. The specimens which retained their coatings remained as abrasion resistant and hard as before treatment. Similar results obtain with silicone, melamine resin and other difficulty removable coatings.

EXAMPLES XIV–XVIII

Tests were run on 1" by 3" sections of shell cases which had been treated to have a high-bake epoxy resin coating. Sets of ten specimens, each set having epoxy coatings varying from 5 mills to 50 mills in thickness, were treated with the compositions indicated below by immersing the sets of samples therein at room temperature for the indicated periods. The compositions were prepared by adding the indicated constituents to containers and allowing the resulting compositions to sit for 24 hours at room temperature to permit achievement of substantially equilibrium conditions before testing proceeded.

|  | Examples | | | |
|---|---|---|---|---|
|  | XIV, Parts | XV, Parts | XVI, Parts | XVII, Parts |
| Methylene chloride | 18 | 18 | 18 | 18 |
| Trichloroacetic acid | 10 | 10 | 10 | 10 |
| Water | 8 | 8 | 8 | 8 |
| Orthocresol | 10 | 10 | 10 | 10 |
| Metacresol |  | 10 |  |  |
| Paracresol |  |  | 10 |  |
| Phenol |  |  |  | 10 |

(All parts are parts by weight of the total composition.) (No other constituents were used.)

The results were observed visually as follows:

Results

XIV—Stripped resin in 30 seconds.
XV—Did not strip resin in 60 minutes.
XVI—Did not strip resin in 60 minutes.
XVII—Did not strip resin in 60 minutes.

The coatings which were stripped off did so by wrinkling and slipping off, leaving the bare metal surface. The removed coatings were soft and pliable. The specimens which retained their coatings remained as abrasion resistant and hard as before treatment. Similar results obtain with silicone, melamine resin and other difficultly removable coatings.

While my invention has been fully described and illustrated, it will be understood that this disclosure is for purposes of exemplification and is not to be taken by way of limitation, the spirit and scope of my invention being limited only by the terms of the accompanying claims.

This invention is a continuation in part of my application Serial Number 482,395, filed on January 17, 1955, now abandoned.

I claim:

1. A method for removing coatings comprising a member of the group consisting of epoxy, silicone and melamine resins, comprising contacting said coatings with a composition substantially free from aliphatic alcohols and consisting essentially of from about 5 to about 25 percent trichloroacetic acid; from about 10 to about 25 percent orthocresol; from 0.1 to about 20 percent water; and not less than about 20 percent of a chlorinated organic solvent relatively unreactive chemically with trichloroacetic acid and orthocresol, the amount of said solvent employed being sufficient to bring the total composition up to 100% by weight.

2. A method for removing coatings comprising a member of the group consisting of epoxy, silicone and melamine resins, comprising treating said coatings with a composition consisting essentially of not less than 5 percent trichloroacetic acid, and up to the limit of solubility of trichloroacetic acid in the composition, not less than 10 percent orthocresol, not less than 0.1 percent water and not less than 20 percent of a chlorinated organic solvent relatively unreactive chemically with trichloroacetic acid and orthocresol.

3. A method as defined in claim 2, wherein said chlorinated organic solvent is chosen from the group consisting of chlorinated aliphatic and chlorinated aromatic compounds.

4. A method for removing coatings comprising a member of the group consisting of epoxy, silicone and melamine resins, comprising contacting said coatings with a composition substantially free from aliphatic alcohols and consisting essentially of from about 5 to about 25 percent trichloroacetic acid; from about 10 to about 25 percent orthocresol; from 0.1 to about 20 percent water; up to about 0.5 percent of a chromate corrosion inhibitor; up to about 1.0 percent of an alkyl naphthalene sulfonate as wetting agent; and not less than about 20 percent of a chlorinated organic solvent relatively unreactive chemically with trichloroacetic acid and orthocresol, the amount of said solvent employed being sufficient to bring the total composition up to 100% by weight.

References Cited in the file of this patent

UNITED STATES PATENTS

| 1,742,347 | Fries | Jan. 7, 1930 |
| 2,043,257 | Missbach | June 9, 1936 |
| 2,242,106 | Buckman | May 13, 1941 |